(12) United States Patent
Krönauer et al.

(10) Patent No.: US 10,654,089 B2
(45) Date of Patent: May 19, 2020

(54) APPARATUS FOR PROCESSING SHEET-METAL WORKPIECES

(71) Applicant: Audi AG, Ingolstadt (DE)

(72) Inventors: Benedikt Krönauer, Wolnzach (DE); Robert Canti, München (DE); Erik Zeller, Ingolstadt (DE); Ludwig Schaller, Ingolstadt (DE)

(73) Assignee: Audi AG, Ingolstadt (DE)

( * ) Notice: Subject to any disclaimer, the term of this patent is extended or adjusted under 35 U.S.C. 154(b) by 560 days.

(21) Appl. No.: 15/445,302

(22) Filed: Feb. 28, 2017

(65) Prior Publication Data
US 2017/0252792 A1    Sep. 7, 2017

(30) Foreign Application Priority Data

Mar. 5, 2016 (DE) .................... 10 2016 002 765

(51) Int. Cl.

| | | |
|---|---|---|
| *B21D 37/10* | (2006.01) | |
| *B21D 43/02* | (2006.01) | |
| *F16P 7/00* | (2006.01) | |
| *B21D 55/00* | (2006.01) | |
| *B21D 24/00* | (2006.01) | |

(Continued)

(52) U.S. Cl.
CPC ............ *B21D 37/10* (2013.01); *B21D 22/02* (2013.01); *B21D 24/00* (2013.01); *B21D 43/025* (2013.01); *B21D 55/00* (2013.01); *B23Q 17/2208* (2013.01); *B30B 15/02* (2013.01); *B30B 15/28* (2013.01); *F16P 7/00* (2013.01)

(58) Field of Classification Search
CPC ...... B21D 5/0272; B21D 37/10; B21D 37/12; B21D 55/00; B21D 5/0209; B21D 5/002; B21D 5/004; F16P 7/00; F16P 7/02; B30B 15/007; B30B 15/044; B30B 15/161; B30B 15/28; B30B 15/285; B30B 15/287; B23Q 17/006; B23Q 17/2208
See application file for complete search history.

(56) References Cited

U.S. PATENT DOCUMENTS

| | | | | |
|---|---|---|---|---|
| 2,199,864 | A | * | 5/1940 | Wehr ................... B21D 5/0272 72/448 |
| 3,467,402 | A | * | 9/1969 | Parker ................... B21D 28/34 279/30 |

(Continued)

FOREIGN PATENT DOCUMENTS

| | | |
|---|---|---|
| CN | 204620823 U | 9/2015 |
| CN | 204659002 U | 9/2015 |

(Continued)

OTHER PUBLICATIONS

European Search Report dated Aug. 3, 2017 with respect to counterpart European patent application EP 17 00 0201.

(Continued)

*Primary Examiner* — Edward T Tolan
(74) *Attorney, Agent, or Firm* — Henry M. Feiereisen LLC

(57) ABSTRACT

Apparatus for processing a sheet-metal workpiece includes a press tool including a bottom die and top die. A press includes a platen which receives the bottom die, and a ram which receives the top die. The press tool is protected by a protective system which detects an idle stroke and includes an adjustable spacer assembly to prevent collision between the top and bottom dies.

8 Claims, 1 Drawing Sheet

(51) Int. Cl.
    *B30B 15/28*       (2006.01)
    *B30B 15/02*       (2006.01)
    *B23Q 17/22*       (2006.01)
    *B21D 22/02*       (2006.01)

(56) References Cited

U.S. PATENT DOCUMENTS

| | | | | |
|---|---|---|---|---|
| 4,004,448 | A | * | 1/1977 | von Holdt ............ B21D 37/10 72/462 |
| 4,426,873 | A | * | 1/1984 | Pearson ............ B30B 15/007 72/389.5 |
| 4,485,660 | A | * | 12/1984 | Takeuchi ............ B21D 19/08 33/627 |
| 4,489,586 | A | * | 12/1984 | Hess ............ B21D 5/0209 72/389.3 |
| 4,570,474 | A | * | 2/1986 | Tanaka ............ B21D 7/06 72/315 |
| 4,732,032 | A | * | 3/1988 | Kogure ............ B21D 5/0272 100/46 |
| 5,103,665 | A | * | 4/1992 | van Merksteijn ... B21D 5/0272 72/389.5 |
| 5,176,017 | A | * | 1/1993 | Tokai ............ B21D 5/0209 72/6.1 |
| 5,199,293 | A | * | 4/1993 | Catti ............ B21D 5/02 72/14.8 |
| 8,099,992 | B2 | * | 1/2012 | Rouweler ............ B21D 5/0209 72/481.2 |
| 2007/0074555 | A1 | * | 4/2007 | Yamamoto ............ B21D 5/02 72/134 |
| 2008/0098793 | A1 | * | 5/2008 | Rogers ............ B21D 5/0209 72/482.2 |

FOREIGN PATENT DOCUMENTS

| | | | |
|---|---|---|---|
| DE | 2007724 A1 | * 9/1971 | ............ B21D 37/10 |
| DE | 100 39 266 A1 | 2/2002 | |
| DE | 102006031438 A1 | 1/2008 | |
| DE | 102011120789 A1 | 6/2013 | |
| FR | 3 008 010 | 1/2015 | |
| FR | 3008010 A1 | 1/2015 | |
| JP | H11 216527 | 8/1999 | |
| JP | H 11216527 A | 8/1999 | |
| KR | 20030088942 A | 11/2003 | |
| KR | 1020030088942 A | 11/2003 | |

OTHER PUBLICATIONS

Translation of European Search Report dated Aug. 3, 2017 with respect to counterpart European patent application EP 17 00 0201.
Chinese Search Report dated Jul. 3, 2018 with respect to counterpart Chinese patent application 2017101239367.
Translation of Chinese Search Report dated Jul. 3, 2018 with respect to counterpart Chinese patent application 2017101239367.

\* cited by examiner

APPARATUS FOR PROCESSING SHEET-METAL WORKPIECES

CROSS-REFERENCES TO RELATED APPLICATIONS

This application claims the priority of German Patent Application, Serial No. 10 2016 002 765.7, filed Mar. 5, 2016, pursuant to 35 U.S.C. 119(a)-(d), the disclosure of which is incorporated herein by reference in its entirety as if fully set forth herein.

BACKGROUND OF THE INVENTION

The present invention relates to an apparatus for processing sheet-metal workpieces.

The following discussion of related art is provided to assist the reader in understanding the advantages of the invention, and is not to be construed as an admission that this related art is prior art to this invention.

An apparatus for forming a sheet-metal workpiece involves for example a press having a press tool, e.g. a forming tool, which includes a bottom die and a top die between which a sheet-metal workpiece is placed and shaped. When the press tool executes an idle stroke in the absence of a sheet-metal workpiece, there is a risk that the bottom and top dies impact one another, causing damage to the tool and in particular to the effective surface areas. This can happen, regardless as to the type of press, i.e. whether the press is operated mechanically or hydraulically.

It is also known to attach so-called rigid distance keepers to the outside of a press tool in an attempt to distance bottom and top dies or their effective surface areas in the lower dead point from one another, when the press tool is run in. As these distance keepers are rigid and thus remain fixed in place. During a working stroke, these rigid distance keepers have to absorb up to 40% and more of the pressing force.

It would be desirable and advantageous to provide an improved apparatus for processing sheet-metal workpieces to obviate prior art shortcomings.

SUMMARY OF THE INVENTION

According to one aspect of the present invention, an apparatus for processing a sheet-metal workpiece includes a press tool having a bottom die and top die, a press having a platen for receiving the bottom die, and a ram for receiving the top die, and a protective system for the press tool, the protective system configured to detect an idle stroke and including an adjustable spacer assembly to prevent collision between the top and bottom dies.

The term "Idle stroke" relates in the description to a clamping or closing stroke, when no sheet-metal workpiece is placed between the bottom and top dies. The presence of such an idle stroke is unwanted because of the risk of collision between the bottom and top dies and can be caused, e.g., when the normal press operation malfunctions, during coil or blank stack change, or during set-up mode. The present invention addresses, i.a., this prior art problem by providing an active tool protective system which detects such idle strokes and thus prevents a collision of the bottom and top dies at the lowermost point of the closing motion (lower dead point). Thus, damage to the effective surface areas of the bottom and top dies, such as their die surface and ram surface, and in particular to their critical edges is prevented. The collision of the effective surface areas is prevented as a result of the presence of a mechanical distancing between the bottom and top dies, using the actively adjustable spacer assembly, which can also be referred to as distancing device.

The press tool may involve a forming tool and/or cutting tool.

According to another advantageous feature of the present invention, the spacer assembly can be arranged on the top die or the bottom die. Suitably, the spacer assembly can be attached to any rigid and immobile main tool component. The spacer assembly may also be arranged on the platen or ram. Depending on the arrangement, the spacer assembly may thus be effective between top die and bottom die, between platen and upper die, between bottom die and ram, or between platen and ram.

According to another advantageous feature of the present invention, the press tool or the press can have a sensor to ascertain the presence of a sheet-metal workpiece. Such a sensor provides information as to whether a sheet-metal workpiece is placed in the press tool during the actual clamping or working stroke. This information may also be provided by a press control (e.g. through querying initiators) to a preceding work station, a transfer or handling system etc.

According to another advantageous feature of the present invention, the protective system can include a control device configured to control the spacer assembly in response to a presence of a sheet-metal work piece in the press tool. The control device may, for example, operate an adjustment element that can move in or move out, or maintain a predefined distance of the adjustment element by causing the adjustment element to move in or move out a certain distance. The control device may be operably connected to an aforementioned sensor that can be installed in the press tool and forms a component of a press control, system control, or the like. Information transmitted by the sensor to the control device is processed by the control device, e.g. using a software algorithm. Advantageously, any required adjustment of the spacer assembly is established unencumbered between the working strokes. In the presence of several spacer assemblies, provision may be made to control and adjust the spacer assemblies in synchronism or also separately.

According to another advantageous feature of the present invention, several adjustable spacer assemblies can be provided to prevent the collision between the top and bottom dies in the presence of the idle stroke and to establish distance keepers during normal working stroke, i.e. in the presence of a sheet-metal workpiece. As a result, not only is a collision between the bottom and top dies avoided, but since the spacer assemblies are adjustable and thus not rigid, the pressing force upon the spacer assemblies is reduced, when the press tool, e.g. a forming tool, is run in, while still being able to maintain proper distance between the bottom and top dies or their effective surface areas in the lower dead point, so as to ensure the quality of the structure.

Advantageously, the spacer assemblies can include adjustment elements that can move in or move out. In this way, there is the possibility to move the adjustment elements out according to need, in part or in their entirety, to realize a certain distance. Otherwise the space assemblies assume the retracted position, so as to remove the space assemblies from the force flux or force transmission path. This means that the exposure to the pressing force can be reduced by up to 40% and more. The adjustable spacer assemblies may thus assume, if need be and when correspondingly configured, the function of a distance keeper to ensure a reliable and adjustable distance between the bottom and top dies or their effective surface areas and thus to ensure the quality of the workpiece being formed.

According to another aspect of the present invention, an adjustable spacer assembly for installation in an apparatus for processing a sheet-metal workpiece includes an adjustment element adapted to move in and out, a spring element applying a spring force to maintain the adjustment element under tension in a move-out direction, and a drive element to move the adjustment element in opposition to the spring force applied by the spring element.

In accordance with the present invention, the adjustment element (or pressure-exerting element) to effect the distance between the bottom and top dies is maintained under tension so as to seek the move-out position, so that the bottom and top dies of the press tool are automatically protected against collision in the event of a power loss, e.g. when an electric or pneumatic supply fails. Using the drive element enables the adjustment element to retract in opposition to the spring force in its entirety or also in part.

According to another advantageous feature of the present invention, the spacer assembly can include a drive mechanism which is arranged in the force flux or force transmission path between the drive element and the adjustment element and which can be configured self-locking so as to prevent the adjustment element from being excessively pushed in by the drive mechanism.

According to another advantageous feature of the present invention, the drive mechanism can include a wedge slide having a slanted surface bearing against a matching surface of the adjustment element so as to move the adjustment element in a vertical direction as the wedge slide is moved in a horizontal direction.

According to another advantageous feature of the present invention, a force sensor may be provided for force measurement. Force measurement is intended to ascertain a force applied in the idle stroke and, optionally, also in the working stroke, upon the adjustment element and thus the force transmitted from the spacer assembly. The ascertained force can be used for monitoring and, optionally, for readjustment or control of the adjustment element position. In addition, position transducer may also be provided to ascertain a position of the wedge slide and/or the adjustment element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
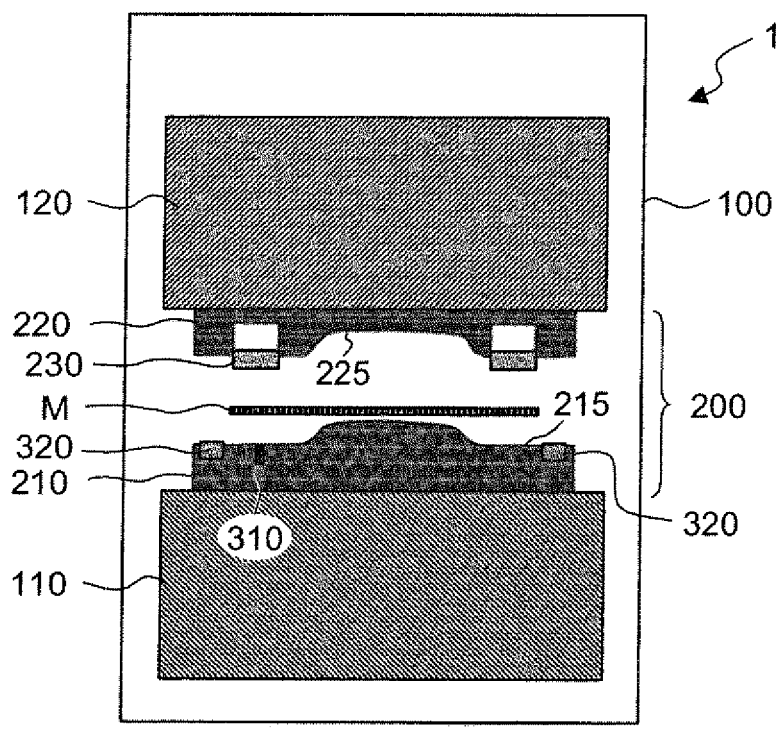
FIG. 1 is a schematic illustration of an apparatus for processing a sheet-metal workpiece in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an apparatus for processing a sheet-metal workpiece M in accordance with the present invention, generally designated by reference numeral 1. The apparatus 1 includes a press 100, shown only schematically and including a platen 110 and a ram 120 structured to move in a vertical direction. The press 100 has a work space in which a press tool 200 is situated. The press tool 200 includes a bottom die 210 and a top die 220. The bottom die 210 is arranged on the platen 110 and the top die 220 is secured to the ram 120. The press tool involves, for example, a sheet-metal forming tool with a downholder or sheet-metal holder 230 arranged in the top die 220 for example. As the ram 120 is lowered (closing stroke), the sheet-metal workpiece M, located between the bottom die 210 and top die 220, is shaped. The bottom die 210 has an effective surface area 215 and the top die 220 has an effective surface area 225.

To avoid a collision between the bottom die 210 and top die 220 during an idle stroke, i.e. a closing stroke in the absence of a sheet-metal workpiece M and thereby prevent damage to the effective surface areas 215, 225, the apparatus 1 includes an active protective system having a sensor 310 and a control device 330 (FIG. 2) to detect the presence or absence of a sheet-metal workpiece M and to maintain a distance between the bottom die 210 and top die 220 at the lower dead point of the ram movement by controlling operation of several adjustable spacer assemblies 320, so as to prevent impact between the effective surface areas 215, 225 of the bottom die 210 and top die 220, respectively (If-Then function).

The spacer assemblies 320 can be arranged, for example, on a base body of the bottom die 210 or on a rigid structure of the bottom die 210, and act directly against the base body of the top die 220 or rigid structure of the top die 220. As described above, other options for attachment are, of course, also conceivable.

Figure 2:
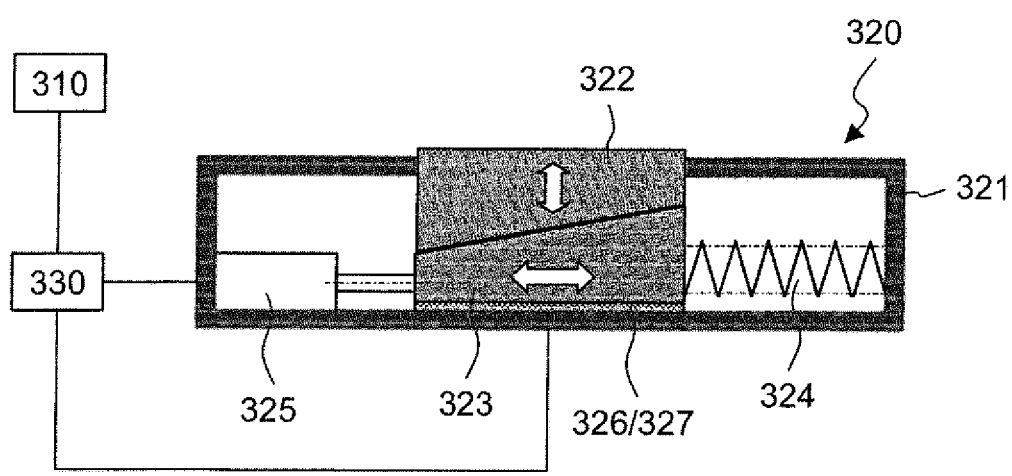
FIG. 2 is a cross sectional view of a spacer assembly installed in the apparatus of FIG. 1.

Referring now to FIG. 2, there is shown a cross sectional view of a spacer assembly 320 of the protective system. The spacer assembly 320 is configured as impact-resistant structure having components which are accommodated in a housing 321 or the like so as to be protected from ingress of dirt. The spacer assembly 320 includes a piston-like pressure-exerting piece or adjustment element 322 which can move in and out by a wedge slide 323. The wedge slide 323 is moved by a wedge-slide mechanism to adjust the position of the adjustment element 322. As the adjustment element 322 moves in and out, the wedge-slide mechanism effects a force transfer and movement transfer with change in direction, as indicated by the double arrows, i.e. as the wedge slide 323 moves in a horizontal direction, the adjustment element 322 is forced to move in a vertical direction. The spacer assembly 320 further includes a spring element 324 by which the wedge slide 323 is maintained under tension to urge the adjustment element 322 to a move-out position. The displacement of the wedge slide 323 is realized by a double-acting drive element 325 to actively move the wedge slide 323 in two directions. As an alternative, the wedge slide 323 may be also be operated by a single-action drive element to actively move the wedge slide 323 in opposition to the spring force applied by the spring element 324, i.e. to move the wedge slide 323 back.

The spring element 324 may involve, e.g., a mechanical spring or gas pressure spring. The drive element 325 may involve, e.g., an electrically-operated or pneumatically-operated actuator. The opposing disposition of the spring element 324 and the drive element 325, as shown in FIG. 2, is to be understood as merely by way of example. The spacer assembly 320 further includes guides and movement stops for the adjustment element 322 and for the wedge slide 323. Reference numerals 326 and 327 designate a force measuring sensor for ascertaining a force (pressure force) acting on the spacer assembly 320, and a position transducer for ascertaining the position of the wedge slide 323 and the adjustment element 322. The spacer assembly 320 may, of course, also include a plurality of adjustment elements 322, spring elements 324 and/or drive elements 325.

During normal operation of the press 100, the adjustment element 322 of each spacer assembly 320 assumes the retracted position, i.e. has moved in. As soon as the sensor 310, installed in the press tool 200, detects in an idle stroke the absence of a sheet-metal workpiece M between the bottom die 210 and top die 220, the adjustment element 322 is dynamically moved out actively by the drive element 325 with the assistance of the spring element 324 and forms a mechanical stop far the top die 220 so that a collision between the bottom die 210 and the top die 220 is prevented (active protection function). The pressing force is then transmitted via the spacer assemblies 320 and not via the effective surface areas 215, 225. Evaluation of the sensor signal from the tool sensor 310 and the operation of the drive elements 324 of the sensor assemblies 320 are executed by the control device 330. As soon as a sheet-metal workpiece NA is disposed between the bottom die 210 and top die 220, the adjustment elements 322 are retracted again. Each spacer assembly 320 is able to absorb great forces or pressing forces. The mechanism for the wedge slide 323 is self-locking to prevent the extended adjustment elements 322 from being pushed in by the top die 220.

Due to the spring force applied by the spring element 324 upon the wedge slide 323, the adjustment element 322 is spontaneously urged to move out as soon as the power supply to the spacer assembly 320 is cut. As a result, the bottom die 210 and top die 220 are automatically protected against colliding in the absence of a power supply (passive protection function).

Advantageously, each spacer assembly 320 is configured such that the adjustment element 322 can be moved not only between a retracted position and an extended position, but any intermediate position may also be assumed. The spacer assembly 320 can therefore also be used as vertically-adjustable distance keepers, as described above. Control of the spacer assembly 320 may also be implemented by the control device 330 as a function of measurement data provided by the force measuring sensor 326 and the position transducer 327.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. Apparatus for processing a sheet-metal workpiece, comprising:
   a press tool including a bottom die and top die;
   a press including a platen for receiving the bottom die, and a ram for receiving the top die; and
   a protective system for the press tool including a sensor to ascertain a presence of a sheet-metal workpiece and an adjustable spacer assembly to prevent collision between the top die and the bottom die, said sensor configured to detect an idle stroke when no sheet-metal workpiece is placed between the bottom die and the top die,
   wherein the spacer assembly includes an adjustment element movable in a substantially vertical direction so as to act against a member selected from the group consisting of bottom die, top die, platen, and ram, a spring element applying a spring force to maintain the adjustment element under tension in a direction against the member, a drive element to move the adjustment element in opposition to the spring force applied by the spring element, and a housing configured to accommodate the adjustment element, the spring element, and the drive element to protect from ingress of dirt,
   wherein the spacer assembly is arranged either entirely on the top die or entirely on the bottom die.

2. The apparatus of claim 1, wherein the spacer assembly is arranged on the top die or bottom die.

3. The apparatus of claim 1, wherein the spacer assembly is arranged on the platen or ram.

4. The apparatus of claim 1, wherein the protective system includes a control device configured to control the spacer assembly in response to a presence of a sheet-metal work piece in the press tool.

5. The apparatus of claim 1, wherein the protective system includes a plurality of said spacer assembly configured to prevent the collision between the top and bottom dies in the presence of the idle stroke and to establish distance keepers during normal working stroke.

6. The apparatus of claim 1, wherein the spacer assembly includes a drive mechanism arranged between the drive element and the adjustment element and configured self-locking so as to prevent the adjustment element from being pushed in.

7. The apparatus of claim 6, wherein the drive mechanism is a wedge slide having a slanted surface bearing against a matching surface of the adjustment element so as to move the adjustment element in the vertical direction as the wedge slide is moved in a horizontal direction.

8. The apparatus of claim 1, wherein the spacer assembly includes a force sensor and/or position transducer.

* * * * *

UNITED STATES PATENT AND TRADEMARK OFFICE
CERTIFICATE OF CORRECTION

PATENT NO. : 10,654,089 B2
APPLICATION NO. : 15/445302
DATED : May 19, 2020
INVENTOR(S) : Benedikt Krönauer et al.

Page 1 of 1

It is certified that error appears in the above-identified patent and that said Letters Patent is hereby corrected as shown below:

In the Claims

In Column 6, Claim 1, Line 3: insert --a-- before "top die".

In Column 6, Claim 1, Line 28: insert --and-- before "a drive element to move the adjustment element".

In Column 6, Claim 1, delete Lines 30-34: "and a housing configured to accommodate the adjustment element, the spring element, and the drive element to protect from ingress of dirt, wherein the spacer assembly is arranged either entirely on the top die or entirely on the bottom die".

Signed and Sealed this
Thirteenth Day of October, 2020

Andrei Iancu
*Director of the United States Patent and Trademark Office*